(12) United States Patent
Knowles et al.

(10) Patent No.: US 7,131,640 B2
(45) Date of Patent: Nov. 7, 2006

(54) ISOLATOR MOUNT FOR SHOCK AND VIBRATION

(76) Inventors: Gareth J. Knowles, 4121 Jarico Hollow Rd., Williamsport, PA (US) 17702; Bruce Bower, 4121 Jarico Hollow Rd., Williamsport, PA (US) 17702

( * ) Notice: Subject to any disclaimer, the term of this patent is extended or adjusted under 35 U.S.C. 154(b) by 25 days.

(21) Appl. No.: 11/001,849

(22) Filed: Dec. 2, 2004

(65) Prior Publication Data

US 2005/0161871 A1    Jul. 28, 2005

Related U.S. Application Data

(62) Division of application No. 10/188,446, filed on Jul. 2, 2002.

(60) Provisional application No. 60/302,579, filed on Jul. 2, 2001.

(51) Int. Cl.
*F16F 1/00*    (2006.01)
(52) U.S. Cl. ..................... 267/136; 188/267
(58) Field of Classification Search ............... 267/136; 188/267
See application file for complete search history.

(56) References Cited

U.S. PATENT DOCUMENTS

| | | | | |
|---|---|---|---|---|
| 5,374,011 A * | 12/1994 | Lazarus et al. | ............ | 244/99.8 |
| 5,552,209 A * | 9/1996 | McCutcheon | ............... | 428/209 |
| 5,687,462 A * | 11/1997 | Lazarus et al. | ............ | 29/25.35 |
| 5,869,189 A * | 2/1999 | Hagood et al. | ............. | 428/461 |
| 6,048,622 A * | 4/2000 | Hagood et al. | ............. | 428/461 |
| 6,069,433 A * | 5/2000 | Lazarus et al. | ............. | 310/333 |
| 6,086,490 A * | 7/2000 | Spangler et al. | ............ | 473/564 |
| 6,095,547 A * | 8/2000 | Vandergrift et al. | ........ | 280/602 |
| 6,102,426 A * | 8/2000 | Lazarus et al. | ............. | 280/602 |
| 6,106,417 A * | 8/2000 | Umlauft et al. | ............. | 473/537 |
| 6,116,389 A * | 9/2000 | Allaei | ........................ | 188/378 |
| 6,196,935 B1 * | 3/2001 | Spangler et al. | ............ | 473/318 |
| 6,974,397 B1 * | 12/2005 | Lammer | ..................... | 473/521 |

* cited by examiner

*Primary Examiner*—Robert A. Siconolfi
(74) *Attorney, Agent, or Firm*—Michael Crilly, Esq.

(57) ABSTRACT

An isolator mount for the active dissipation of shocks and vibrations is presented. The invention includes at least one energy dissipating element disposed between deflectable elements so as to provide soft damping for small disturbance excitations, yet remaining sufficiently stiff to mitigate large shocks. The mount transfers mechanical energy to the dissipating element via the device structure. Dissipating element mitigates the energy in shocks and vibrations as either heat or magnetic energy. A snap-together modular embodiment enables the coupling of two or more isolators for use within a wide variety of shock and vibration applications. Quasi-static tuning of one or more mounts comprising a snap-together module facilitates an active response to changing conditions.

7 Claims, 15 Drawing Sheets

ISOLATOR MOUNT FOR SHOCK AND VIBRATION

CROSS-REFERENCE TO RELATED APPLICATIONS

This application is a divisional application of co-pending application Ser. No. 10/188,446, filed on Jul. 2, 2002, and claims the benefit of U.S. Provisional Application No. 60/302,579, filed on Jul. 2, 2001. The subject matters of the prior applications are incorporated in their entirety herein by reference thereto.

FEDERALLY SPONSORED RESEARCH OR DEVELOPMENT

None.

BACKGROUND OF THE INVENTION

1. Field of the Invention

The present invention generally relates to an isolator mount. Specifically, the invention includes an alloy or rare earth integrated within an active-mode isolation mechanism so as to impede both shocks and vibrations. Methods of manufacture are described facilitating the integration of alloys and rare earths within a plastic, composite, and metal.

2. Related Arts

Naval ships employ a wide variety of isolator mounts to impede acoustic transmissions and to protect sensitive equipment from shocks and vibrations. Presently, isolator mounts are specifically designed for a limited range of shocks and vibrations. As such, a variety of mounts are required to satisfy a wide range of mechanical load conditions.

Energy dissipation mechanisms employed within presently known devices quickly degrade with use thereby requiring frequent replacement. For example, passive mounts comprised of rubber and metal rapidly lose their damping capacity. Consequently, isolator mounts are often used well beyond their effective lifetime thereby compromising the integrity and performance of shipboard systems.

Active mounts with integrated electronics increase the range of shocks and vibrations effectively isolated. However, active mounts are generally less durable and sensitive to environmental conditions. For example, wires externally attached to such devices are susceptible to breakage. Furthermore, electronics within such devices are susceptible to the very shocks and vibrations dissipated and to damage by saltwater, ozone, and oil contaminants.

Low-frequency shocks, typically from 3 to 10 Hz, and vibrations, typically from 5 to 30 Hz, exclude many passive and active damping devices. For example, the effectiveness of viscoelastic damping increases with frequency and is therefore of limited utility at low frequencies. Passive damping by piezoelectric or electrostrictive devices, also referred to as direct effect damping devices, is not particularly useful at low bandwidths since damping is dependent upon hysteresis loops and elastic-mechanical-to-electrical energy coupling. Coupling coefficients are generally poor and total loss is insignificant at the lower dynamic range.

Piezopolymers are better direct coupling materials than piezoceramics and electrostrictors, therefore applicable to piezo-passive damping devices. In a passive-mode device, a generalized matched impedance circuit is coupled to the active ferroelectric materials so as to transfer elastic energy to heat. In a semi-active mode, the circuit is variably tunable. However, strength and stiffness characteristics preclude the use of ferroelectric polymers, such as PVDF and urethane, as active devices.

What is required is an isolator mount possessing both soft damping for small disturbance excitations and stiffness to mitigate large shocks.

What is required is an isolator mount having a high level of damping effective against shocks and vibrations yet which remains sufficiently stiff otherwise.

What is required is an isolator mount that functions over a wide range of temperature and load conditions.

What is required is an isolator mount that facilitates quasi-static tuning for adaptive passive damping.

SUMMARY OF THE INVENTION

An object of the present invention is an actively passive damping device capable of mitigating shocks and vibrations within a benign environment.

The present invention is a self-contained, modular shock and vibration mount. Mounts described and claimed herein are compatible with existing naval systems and equipment, sufficiently responsive to achieve mitigation requirements, and substantially capable so as to reduce inventory needs. The invention may be configured to form various geometries, including cylindrical embodiments for pipes and block-like embodiments for machinery and electronics cabinets. A snap-together modular embodiment with quasi-static tuning adjustment enables the invention to address a wide variety of conditions and to facilitate response to changing conditions. Quasi-static tuning adjustments are commanded automatically or remotely via a plug-in sensor or microcontroller. The invention is both durable and resilient having excellent passive shock response from near dc to mid-range, typically 3 Hz to 40 Hz, and vibration suppression for small excursions into the kilohertz range. The invention includes materials and damping methods that achieve the described mitigation while retaining design durability.

The invention is composed of one or more materials, often referred to as lossy, capable of absorbing and dissipating energy. For example, lossy materials may passively damp shocks and vibrations when composed of magneto-mechanical or super-elastic alloys so as to couple mechanical energy to magnetism or heat. Alloys may be combined with highly durable fiber-reinforced elastomeric materials to further enhance the isolation of shocks and vibrations. Isolators may be composed of rare earth coatings, laminated materials, and ferrous treated rare earth particulates.

In an alternate embodiment, an electric or magnetic field is passed through the described materials so to actively maximize passive damping behavior. For example, a field may be applied to active alloys, magneto-mechanical and shape memory, embedded within a matrix. The tuning of passive parameters is distinct from driving such mechanisms actively, since the former is essentially a quasi-static application to induce changes in performance in response to load and/or environmental factors.

The present invention relies on fiber-reinforced elastomeric damping rigidized by fiber inclusions to achieve a high stiffness yet retain viscoelastic damping properties. Fiber-reinforced elastomers include random or oriented short fibers integrated into a resin transfer mold or injection manufactured matrix, one example being a thermoplastic. Fiber-reinforced elastomers may pre-stress alloy inclusions so as to further improve shock and vibration characteristics.

Magneto-mechanical passive damping is applicable to shocks and vibrations. For example, magnetic iron alloys are not only durable but also transform elastic energy into magnetic energy on each cycle according to the ratio $k^2/(1-k^2)$. If the magnetic system has a high-loss factor, less energy is returned to the load transfer path and the shock or vibration is damped. The primary loss phenomenon is energy dissipation via hysteresis, generally independent of frequency but strongly dependent upon amplitude.

Super-elastic passive damping is applicable to shock mitigation. Super-elastic alloys function as a high-loss damping material. The strain required for damping is too large for some applications. However, such damping is appropriate for ship-based shock mitigation applications where several inches of displacement are common. The stress cycle of a super-elastic alloy involves a large elastic hysteresis that transforms elastic mechanical energy into heat without significantly raising the temperature of the material. Such materials damp motions from near-dc up to 80 hertz.

Alloy inclusions may include a variety of smart material alloys, which produce a change of dimension, shape, or stress in response to an applied magnetic field. Materials include magnetostrictive alloys, one example being Fe—Tb—Dy (Terfenol-D was developed by the Naval Ordnance Laboratory, USA), and Magnetic Shape Memory (MSM) alloys. MSM alloys combine the large and complex shape changes of shape memory alloys and the fast and precise response of magnetic control. Referenced materials allow quasi-static control of isolator mounts so as to customize their response to changing load conditions.

Other materials applicable to the present invention include ferromagnetic shape alloys (FMSA). The properties of FMSAs are described by S. J. Murray, et al., in "*Field-Induced Strain Under Load in Ni—Mn—Ga Magnetic Shape Memory Materials*," Journal of Applied Physics, 1998. FMSAs of particular interest to the present invention are based on high-magnetization alloys of Fe—Ni—Co. These alloys have a large hysteresis, hence large loss and damping. Fe-based FMSAs are less expensive, have a broader temperature range, and are a higher authority alternative to Ni—Mn—Ga alloys, since a larger saturation magnetization implies stronger response to applied magnetic fields.

The present invention also includes a thermoplastic mount incorporating an externally constrained viscoelastic damping layer and/or ferromagnetoelastic damping laminate, otherwise referred to as treatments. Treatments are individually applied or applied in combination to commercially available mounts. Described applications result in a small loss in isolation (<5%) and a correspondingly large increase in wide band damping (>40%) to nearly dc.

The present invention is manufactured via several methods including lamination, coating, and composite molding. Composites are constructed as pseudo-fiber composites, as described by R. E. Newnham in "*Molecular Mechanisms in Smart Materials*," MRS Bulletin 20–34, 1997. Composites may incorporate structural foam to induce pressure and reduce bubble formation.

The present invention may be fabricated via a non-conventional method of extrusion enabling the netshape production of thermoplastic damping elements, including formulations of Hytrel®, about an energy dissipating material. The described method not only introduces a more reliable method for fabricating mounts, but enables the present invention to mimic enhanced performance of a ferromagnetoelastic damping laminate in a full composite construction. Damping alloys are introduced as particulates or fibers during the pre-mixing process. Although the present invention may be similarly applied to injection molding techniques, extrusion allows the ferromagnetoelastic materials to be aligned into virtual chains to increase damping effectiveness.

The alignment of particulates for pseudo-fiber construction is described in "*Magnetostriction, Elastic Moduli and Coupling Factors of Composite Terfenol-D Composites*," Journal of Applied Physics, 1999. In the present invention, an FMSA, MSM, cobalt ferrite, or Terfenol alloy may be mixed with a low-viscosity resin. After sieving, the mixture is degassed and prepared for particle alignment. Particles are aligned along magnetic flux lines within a large magnetic field. The assembly is cured after particulates are aligned during thermoset and/or extrusion.

A preferred fabrication method is extrusion between two large magnetic field devices, one example being permanent magnets. The magnetic field and direction of extension aligns the embedded magnetic particulates into so-called pseudo chains oriented in a preferred direction to enhance damping. The invention maximizes passive damping characteristics of the finished article. In some alloys, it may be desirable to add ferrite so as to facilitate the alignment process. As such, it is distinct from the related arts.

The present invention exploits the passive capability of rare earths and metallic alloy composite materials. Terbium, Dysprosium, and ferromagnetic particulates become increasingly magnetic with decreasing temperature. At a sufficiently low temperature, pseudo-fiber alignment of rare earth particulates within a resin is achieved in the absence of any additional ferromagnetic particle fraction. However, this behavior eliminates many useful thermoplastics that do not set at temperatures required for alignment. More exotic matrix materials may be required, adding to the cost of manufacture. Thus, another embodiment of the isolation mechanism may include randomly distributed Terfenol, FMSA, or other damping alloys.

The preferred manufacture process, either RTV or profile extrusion or injection molding, may also include super-elastic materials, either ribbon or short fiber inclusions, within a resin mix. Size, volume fraction, and preload of NiTi is related, just as with the rare earth or rare earth-ferromagnetic inclusions, to the pre-stress exerted by the matrix as it shrinks about the particulates. Pre-stress is further enhanced with structural foam. External loads transferred by the mount further pre-stress the particulates. Greater pre-stress will generally improve both passive magneto-elastic damping by Terfenol and rare earth inclusions and shock isolation by super-elastic inclusions. The relative softness of such materials allows for an embodiment whereby NiTi, in a suitably chosen super-elastic phase, is laminated onto the mount. The laminate is further coated or laminated with a durable material, one example being urethane.

Extrusion manufacture offers a low-cost approach to the development of internally damped thermoplastic products. Polymer extrusion is a viable method for manufacturing C-mounts. This technique utilizes an extruder to plasticate the polymeric material with correctly aligned molecular orientation as it extrudes from a shaping die. A traveling saw may be used to cut lengths of C-mount from the continuous extrusion.

Embodiments of the present invention and methods therefore facilitate durable isolation mounts for a wide variety of shock and vibration applications.

BRIEF DESCRIPTION OF THE DRAWINGS

The invention will now be described in more detail, by way of example only, with reference to the accompanying drawings, in which.

REFERENCE NUMERALS

Figure 1:
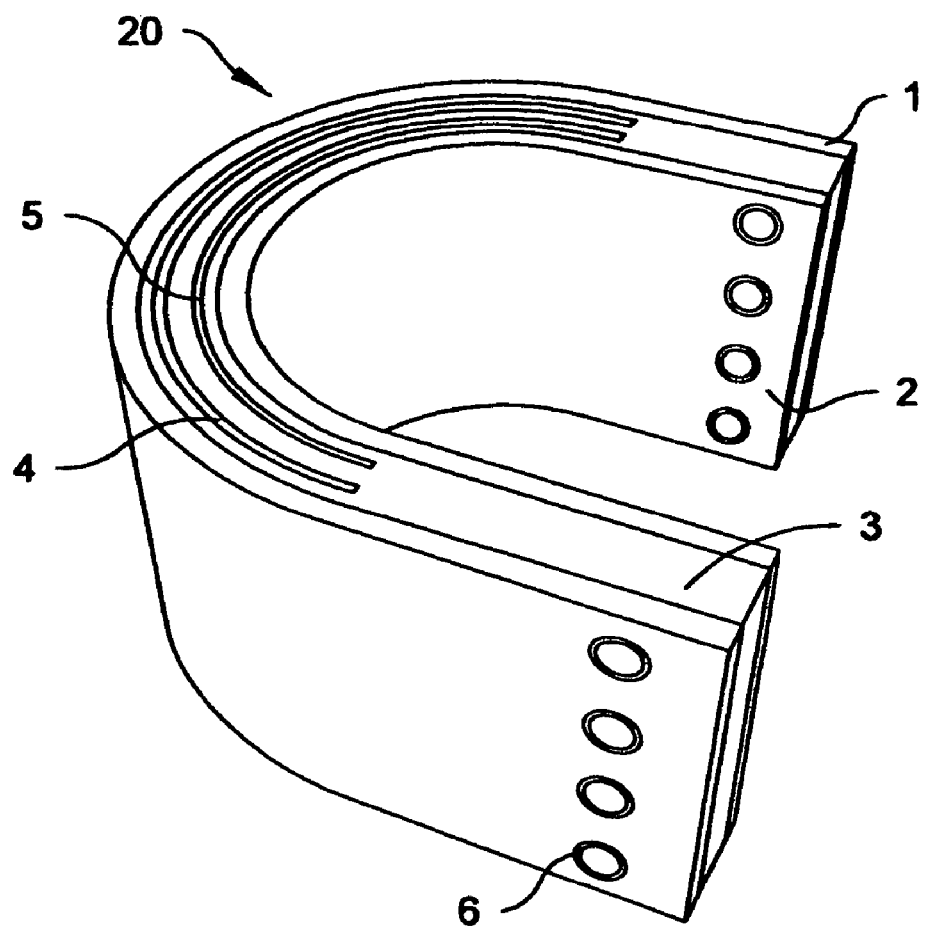
FIG. 1 is a perspective view of an exemplary C-mount.

1 First layer
2 Second layer
3 Third layer
4 First insert
5 Second insert
6 Fastener
7 Composite shell
8 Rigid element
9 Damping element
10 Top cover
11 Bottom cover
12 Electronics module
13 Fill
14 Outer damping shell
15 Inner damping bulkhead
16 Damping seal
17 Flange
18 Connector
19 Copper winding
20 C-mount isolator
21 Open end
22 Bond layer
23 Coating
24 Coating
25 Magnet
26 First half
27 Second half
30 D-mount isolator
31 Multi-mount block
32a, 32b Block
35 Mount
36 Damping layer
37 Damping layer
38 Microsensor patch
39 Cap
40 Component
41 Cap
42 Mount
43 Self-tuning embedded chip
44 Connector
50 Mounting surface
101a, 101b Alignment device
102 Machine
103 Composite
104 Damping material
105a, 105b Alignment device
106 Extrusion direction
107 Extruder die
108 Extruded C-mount
109 Molecular orientation

DESCRIPTION OF THE INVENTION

Referring now to FIG. 1, a laminate embodiment of a C-mount isolator 20 is shown having a first insert 4 and second insert 5 embedded within a third layer 3 and thereafter sandwiched between a first layer 1 and a second layer 2. While c-shaped mounts are described, other shapes are possible.

First layer 1 and second layer 2 provide structural rigidity during normal loading conditions. First layer 1 and second layer 2 are composed of an energy absorbing material capable of withstanding repeated deflections and large strains. Preferred materials include spring steel and thermoplastics.

The third layer 3 is composed of a composite, polymer, or elastomer. Preferred embodiments are composed of a fiber-reinforced elastomer. The primary function of the third layer 3 is to provide sufficient stiffness so as to transfer strain into the first insert 4 and second insert 5 while providing a level of elastomeric damping at higher frequencies.

First insert 4 and second insert 5 are composed of various materials. For example, a magnetostrictive material may consist of either a magnetostrictive material alone or a magnetostrictive composite composed of Terfenol, cobalt ferrite, FMSA, MSM, or Metglas. In alternate embodiments, first insert 4 and second insert 5 may be composed of a magneto-memory material, preferably constrained within a third layer 3 composed of a short-fiber, reinforced elastomer.

Figure 9:
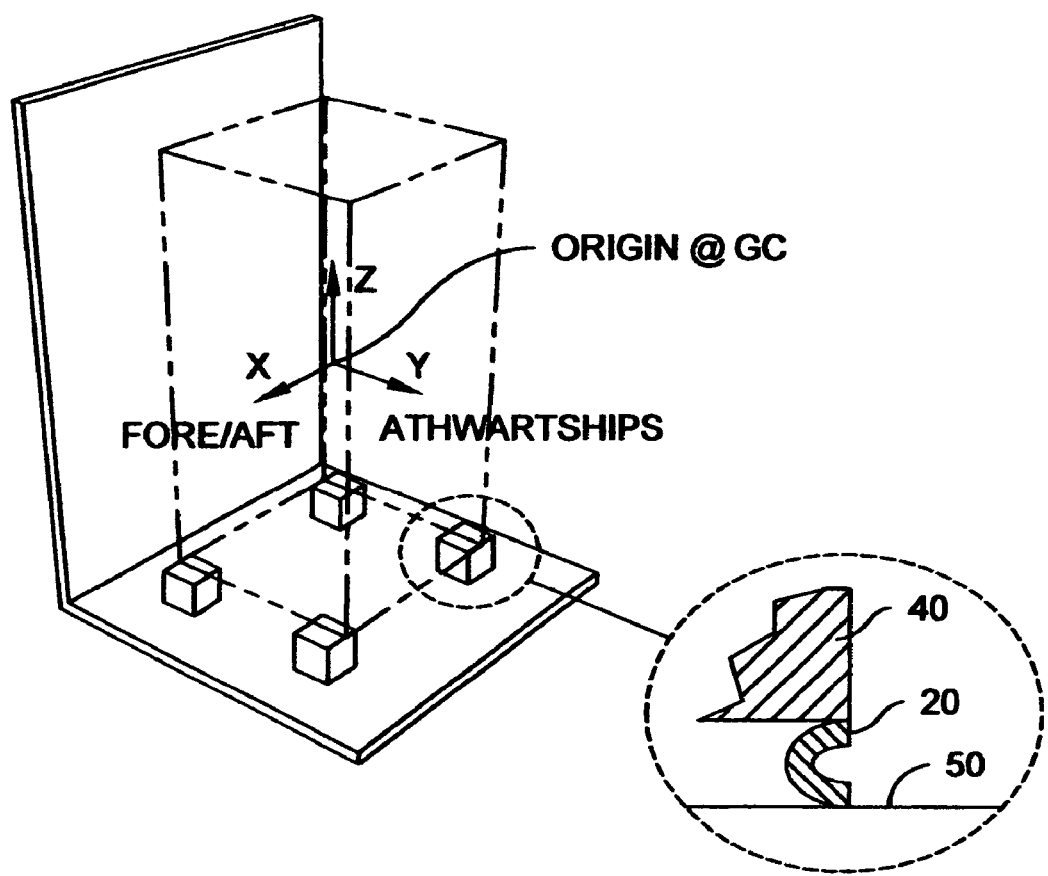
FIG. 9 is a schematic diagram showing an exemplary four-point arrangement of shock-vibration mounts between a component and mounting surface.
Figure 13A:
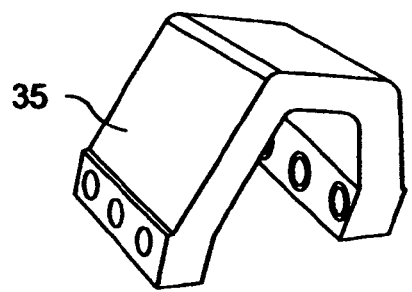
FIGS. 13a–13d are photographs showing several mounts having damping layers and plates.

In yet other embodiments, first insert 4 and second insert 5 may be composed of different damping alloys. For example, the first insert 4 may be a magneto-mechanical alloy and the second insert 5 a shape memory alloy both embedded within a third layer 3 composed of a fiber-reinforced elastomer. First layer 1, second layer 2, and third layer 3 are molded to shape and machined, via techniques understood in the art, so as to enable attachment at either end via fasteners 6. Preferably, fasteners 6 should allow for the passage of a bolt to secure the c-mount isolator 20 between a mounting surface 50 and a shipboard component 40, as shown in FIG. 9. Thickness and relative modulus of the laminate materials are design dependent and chosen to maximize coupling of elastic energy in shocks and vibrations into heat and magnetic energies within the damping materials. The invention may employ a variety of inserts integrated with a C-mount isolator 20, either internally as shown in FIG. 1 or externally as laminates as shown in FIGS. 13*c*–13*d*.

As is understood in the art, magneto-mechanical alloys and composites dissipate mechanical energy as magnetic energy, whereas super-elastic alloys and elastomers dissipate energy as heat. Magnetostrictive composites are formed by mixing one or more powdered magnetic materials, examples including but not limited to Terfenol-D, SmPd, $SmFe_2$, and CbFe. Application dependent properties are tailored by elastomer type, volume fraction of ferromagnetic powder and insulated magnetic binders, and orientation of magnetostrictive particles. Preferred embodiments are solidified having pseudo-chains therein induced via a magnetic field during extrusion. The heating process may be performed in the presence of a magnetic field with powder ground in an inert environment. Magnetic and electrical properties of feedstock are chosen to optimize eddy current losses and maximize magnetic hysteresis attributes.

Figure 3:
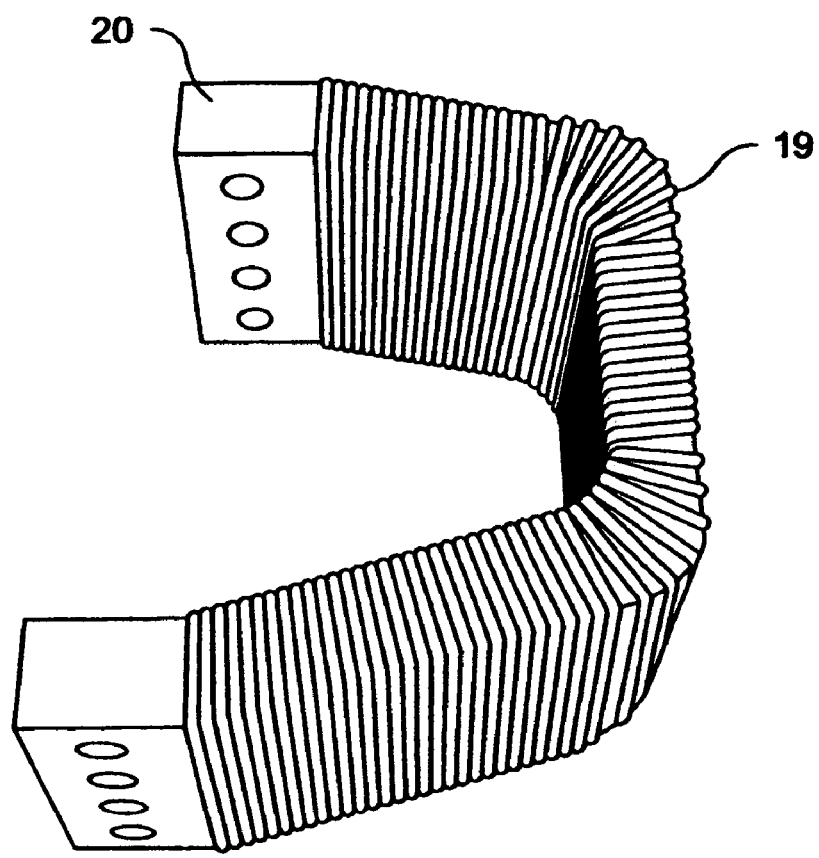
FIG. 3 is a perspective view of a C-mount with copper wire windings disposed along the exterior of the mount.
Figure 4:
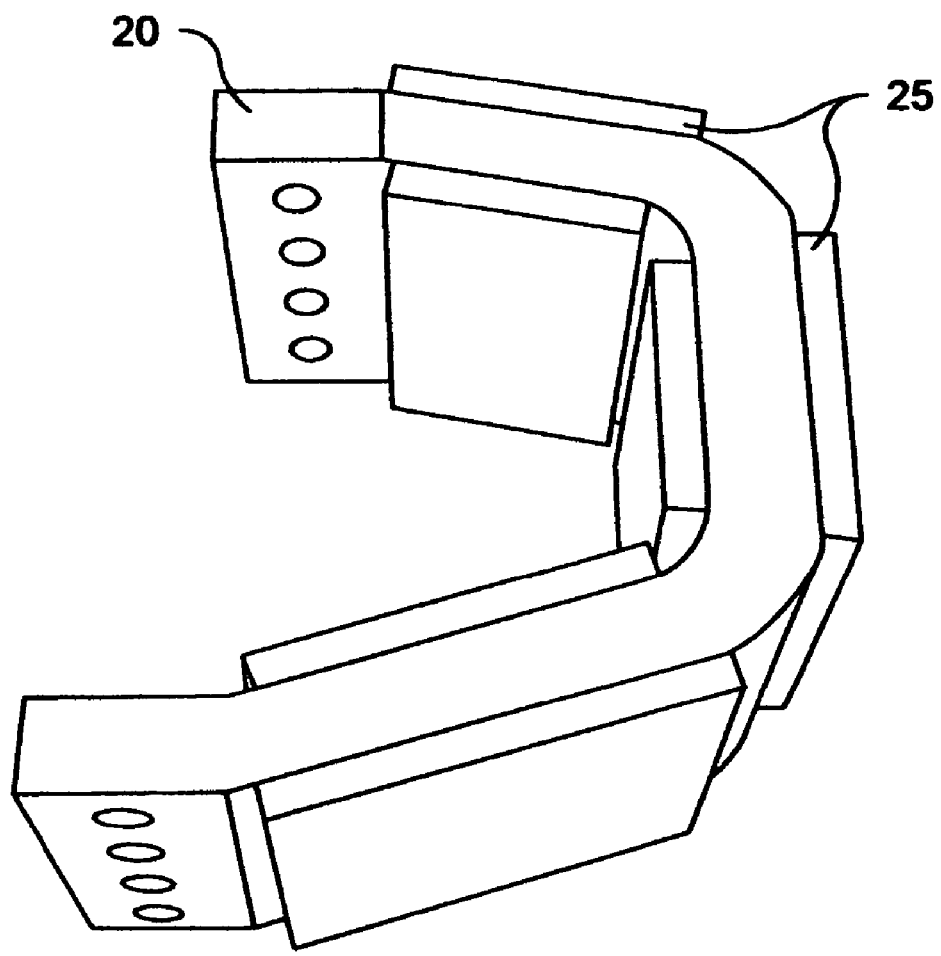
FIG. 4 is a perspective view of a C-mount having magnets disposed along the exterior of the mount.

Several methods may be used to align the magnetized particulates. Referring now to FIG. 3, a copper winding 19 is shown about the exterior of a C-mount isolator 20. The copper winding 19 aligns the magnetostrictive, rare earth or rare earth/ferromagnetic particulates in a tangential fashion when energized. Flux lines run lengthwise along the C-mount isolator 20 so that virtual chains of alloy or rare earth inclusions are aligned lengthwise along the C-mount isolator 20. Referring now to FIG. 4, an alternate method is shown wherein one or more magnets 25 are aligned along the C-mount isolator 20 so as to induce a radial alignment of virtual chains within the alloy.

Figure 5:
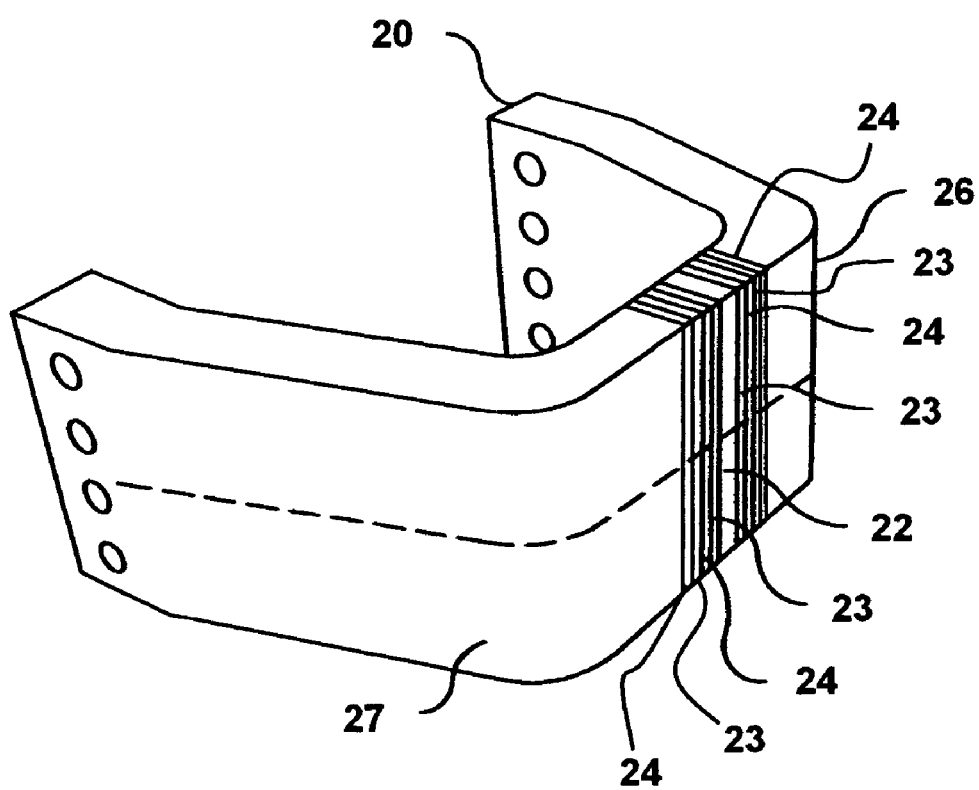
FIG. 5 is a perspective view with partial section view of an alternate embodiment of a C-mount with internal coatings of rare earth materials.

A third method is provided whereby a C-mount isolator 20 is externally or internally coated, using techniques known within the art, with a rare earth, examples including Terbium or Dysprosium. Referring now to FIG. 5, an internal coating approach is shown whereby the C-mount isolator 20 is composed of a first half 26 and a second half 27 and thereafter coated with successive coatings 23, 24 of like or different rare earth materials. In some embodiments, small amounts of ferromagnetic material, such as Terfenol, FMSA, and magnetic shape memory materials may be added to each layer. Once the coating process is completed, first half 26 and second half 27 are bonded together via a bond layer 22, one example including a fiber-reinforced elastomer.

Figure 7:
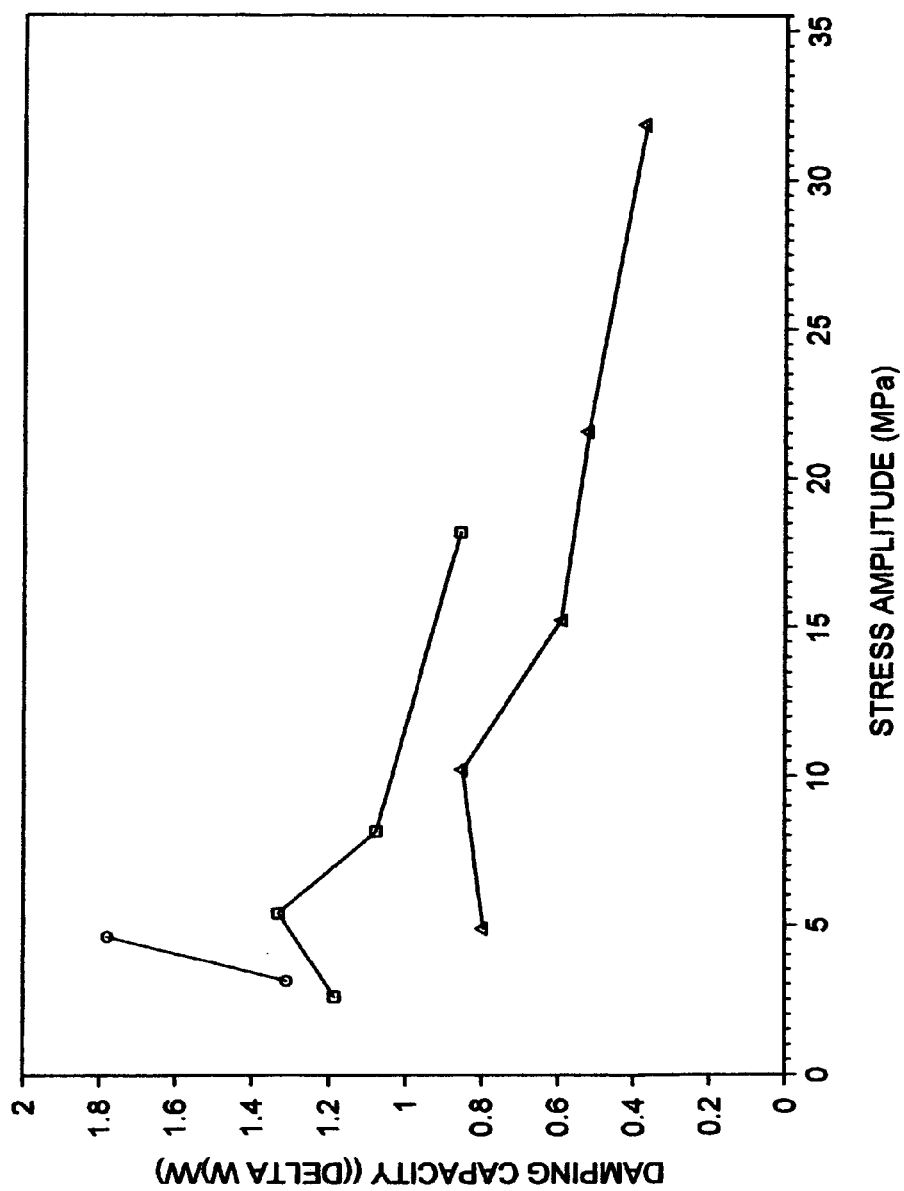
FIG. 7 is a graph of damping capacity versus stress amplitude comparing the performance of several magneto-mechanical alloys.

Embodiments of the present invention may include an external laminate construction composed of magneto-mechanical alloys, Terfenol, super-elastic, and constrained layer viscoplastic laminates with a loss factor optimized for room temperature. Referring now to FIG. 7, several Terfenol samples are shown having a damping capacity well above unity, thereby indicating applicability to high-stress applications. In general, magneto-elastic and ferromagnetic materials are more dissipative at bias stress. A third layer 3 composed of fiber-reinforced silicon rubber may be used to pre-stress the alloy and to provide a protective anti-corrosion cover. Pre-stressing is also achieved with structural foam.

Figure 2:
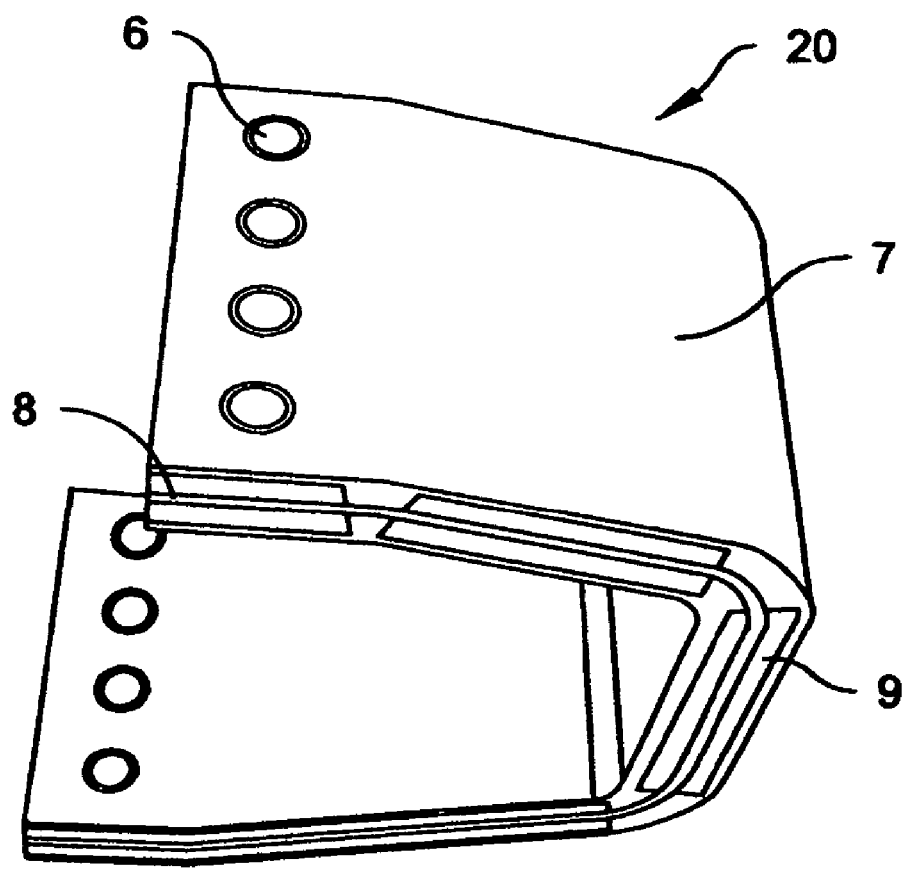
FIG. 2 is a perspective view of an alternate embodiment of a C-mount.

Referring now to FIG. 2, an alternate embodiment of the C-mount isolator 20 is shown having a rigid element 8 onto which is attached damping elements 9, either magneto-mechanical or super-elastic alloys, thereafter encased within a composite shell 7. The composite shell 7 is composed of an extruded, cast, or molded fiber-reinforced plastic. The composite shell 7 may be confined between a first layer 1 and a second layer 2, as shown in FIG. 1. Damping elements 9 may consist of one or more continuous layers or segmented elements along the length of the C-mount isolator 20. Damping elements 9 may be composed of a material that converts elastic-mechanical energy to heat energy, one example being a super-elastic alloy.

Figure 8:
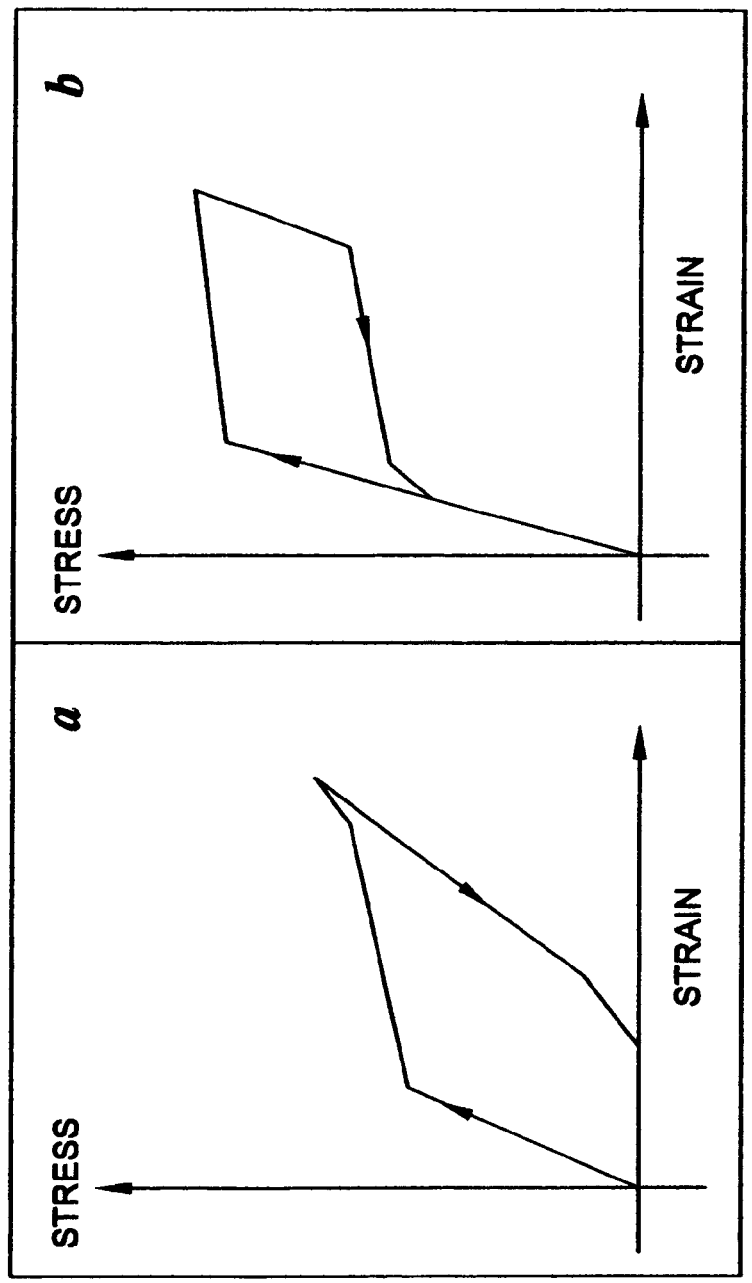
FIG. 8 is a graph of stress versus strain showing the hysteresis for an exemplary super-elastic alloy.

Referring now to FIG. 8, the hysteresis characteristics of a typical super-elastic alloy is shown in a stress-strain plane. The leftmost graph shows a conventional shape memory alloy, whereas the rightmost shows the same material functioning in a super-elastic phase. In still other embodiments, damping elements 9 may be composed of one or more magneto-mechanical and super-elastic alloys.

Figure 14A:
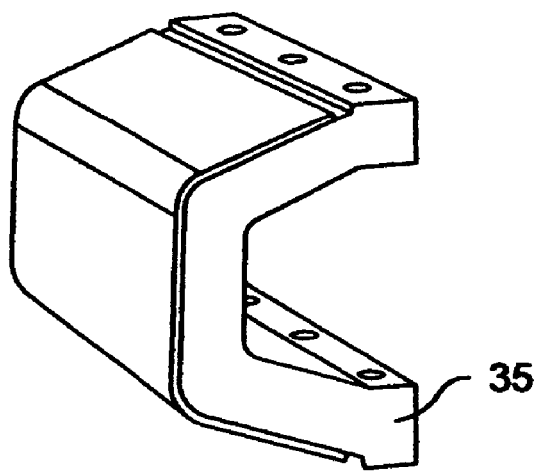
FIGS. 14a–14b are photographs of mounts comparing an unconstrained damping mount to one embodiment of the present invention.
Figure 14B:
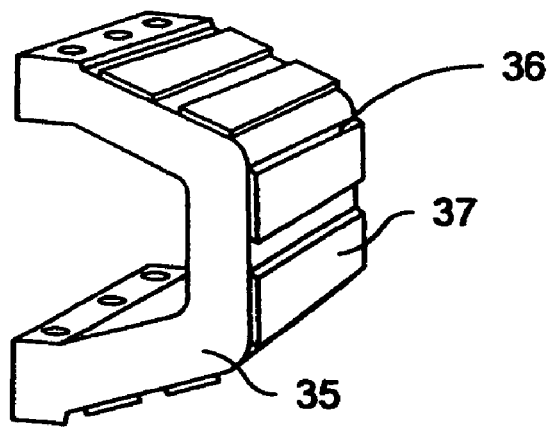

Referring now to FIGS. 14*a* and 14*b*, a prior art embodiment is compared to one embodiment of the present invention. FIG. 14*a* shows an unconstrained polymer damped mount 35 wherein the laminate is neither constrained nor segmented. Damping is introduced by bonding a viscoelastic polymer to a series 1B or 2A C-Worthy mount manufactured by the Northrop Grumman Corporation. FIG. 14*b* shows a constrained mount 35 including a damping layer 36 disposed between and attached to both mount 35 and damping plate 37. The segmented PCLD treatment shown in FIG. 14*b* is either single or double-sided. The constrained arrangement imposes a large shear into the polymer during shocks and vibrations thereby causing lose via material hysteresis.

Figure 13B:
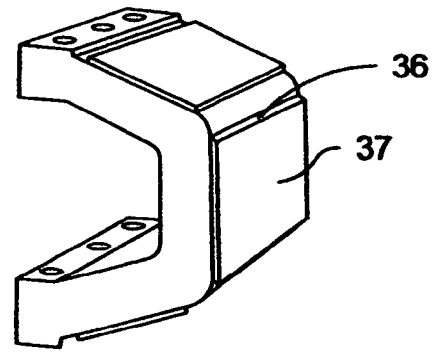
Figure 13C:
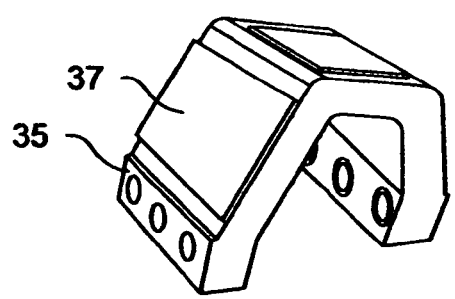
Figure 13D:
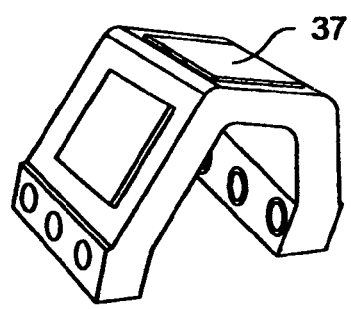

Referring now to FIGS. 13*b*–13*d*, various embodiments of the constrained mount 35 are show. FIG. 13*a* shows an untreated mount 35. FIG. 13*b* shows a mount 35 with PLCD laminate. FIG. 13*c* shows a mount 35 with a super-elastic SMA laminate. FIG. 13*d* shows a mount 35 with a magnetostrictive laminate. Preferably, damping layer 36 and/or damping plate 37 should be positioned at locations of maximum strain.

TABLE 1 summarizes damping as a percentage increase for several deflections at 1 Hertz for mounts 35 shown in FIGS. 13*b*–13*d* and 14*b*. TABLE 2 summarizes damping as a percentage increase for several frequencies at a 0.05-inch deflection for mounts 35 shown in FIGS. 13*b*–13*d* and 14*b*.

TABLE 1

| Deflection (inches) | 0.05 | 0.10 | 0.15 | 0.25 |
|---|---|---|---|---|
| Magnetostrictive Treatment | 29.02% | 44.87% | 40.64% | 47.32% |
| Viscoelastic Treatment | 38.28% | 47.70% | 52.27% | 57.17% |
| Super-elastic Treatment | 44.92% | 30.37% | 43.40% | 46.40% |

TABLE 2

| Frequency (Hertz) | 1 | 2 | 5 | 10 |
|---|---|---|---|---|
| Magnetostrictive Treatment | 29.02% | 26.80% | 35.88% | 39.86% |
| Viscoelastic Treatment | 38.28% | 35.80% | 38.31% | 49.10% |
| Super-elastic Treatment | 44.92% | 46.35% | 40.64% | 47.32% |

Figure 6:
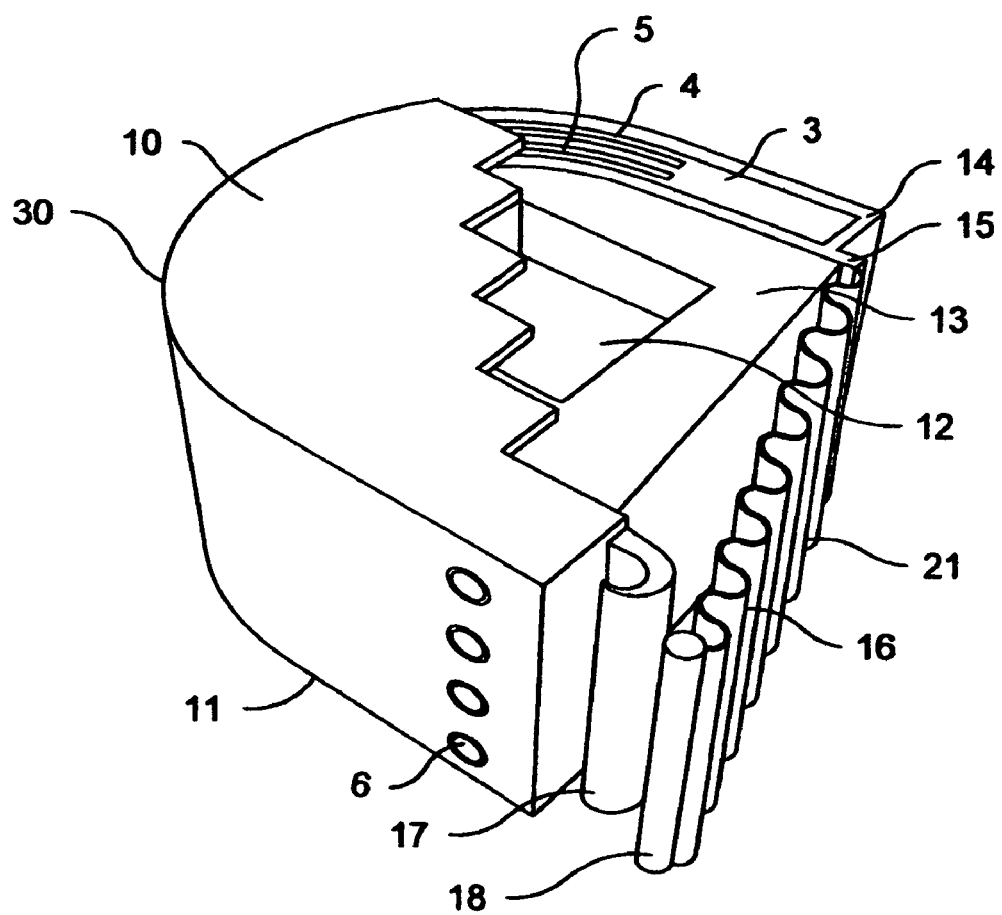
FIG. 6 is a perspective view with partial section view of an exemplary D-Mount.
Figure 11:
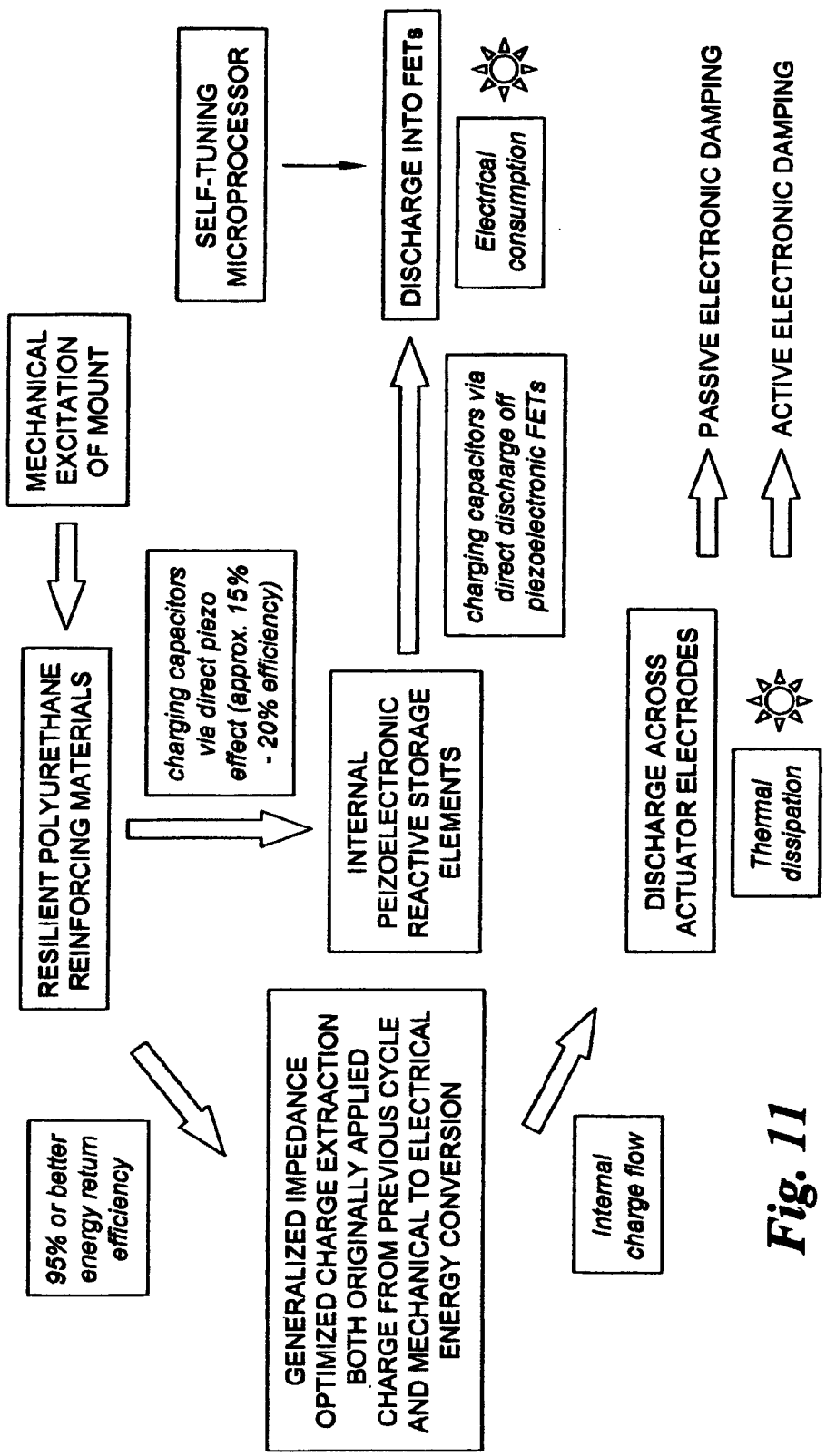
FIG. 11 is a schematic flowchart describing electronic damping via dynamic impedance.

Referring now to FIG. 6, an active-passive embodiment of the present invention is shown and referred to as a D-mount isolator 30. A typical D-Mount isolator 30 is a fully enclosed unit with an electronics module 12 secured within a fill 13 of low-density material, including but not limited to foam. The electronics module 12 dissipates mechanical excitations via active electronic damping or via passive electronic damping, as described in FIG. 11. A third damping layer 3 with one or more first inserts 4 and second inserts 5 are enclosed between an outer damping shell 14 and an inner damping bulkhead 15. Outer damping shell 14 and inner damping bulkhead 15 are composed of an energy absorbing material capable of withstanding large repeated deflections and strains, preferably spring steel. Both outer damping shell 14 and inner damping bulkhead 15 provide structural rigidity and integrity during non-loading conditions. Fasteners 6 secure the outer damping shell 14, third layer 3, and inner damping bulkhead 15. A lightweight damping seal 16 is attached along the open end 21 of the D-mount isolator 30 and secured to the inner damping bulkhead 15 via a flange 17 and connector 18 coupling. A top cover 10 and bottom cover 11 are attached to the outer damping shell 14 and composed of a flexible, yet durable material capable of withstanding environmental conditions and contaminants present in ship-based applications.

The volume of a D-mount isolator 30 is determined in part by the electronics module 12. A small electronics module 12 is possible, since magneto-mechanical effects are a function of field reversal. In an actively-passive embodiment, the controller is required to switch polarity which may be performed by a trans-impedance current source upstream. The switch mechanism requires a small H-bridge switcher, an element understood in the art, integrated within the D-mount isolator 30. The switcher resets the magneto-mechanical material after one or more loads are applied to the D-mount isolator 30.

The board plane of the electronics module 12 is oriented along the shock and vibration plane and encased within a low-density fill 13 to avoid shock and vibration damage to the electronics module 12. A top cover 10 and bottom cover 11 consisting of a thin sheet of polyurethane is added to prevent exposure to and damage by oil, ozone, saltwater. A corrugated polyurethane is provided along the open end 21. The electronics module 12 is positioned so as to avoid the introduction of shocks and vibrations.

The polyurethane provides corrosion resistance and additional electronic damping via the direct piezoelectric effect of the urethane. The electrically converted elastic energy is coupled into a compact generalized impedance circuit mounted within the elastomeric portion of the C-mount isolator 20 or simply absorbed by the switcher H-bridge circuitry of the active D-mount isolator 30.

In the D-Mount isolator 30, the third layer 3, typically a fiber-reinforced silicon rubber, functions as an anti-corrosion shell and heat sink. When used adaptively in an active mode, the fiber-reinforced silicon rubber functions as a low frequency motion amplifier driven by high-power magneto-mechanical actuators.

The lightweight damping seal 16 is composed of a corrugated polyurethane to dissipate incident wave energy through friction associated with liquid and solid phases of the foam. Polyurethane, having a simple wave shape, is embedded into the urethane foam and bonded to the surface of D-mount isolator 30 to create a distributed vibration absorber. The acoustic absorber integrates the distributed piezoelectric polymer between individual layers of absorbing foam in a thin sandwich. The sound absorbing material is a partially reticulated polyurethane foam.

Referring again to FIG. 6, the fill 13 is composed of a highly resilient polyurethane exhibiting higher direct coupling of elastic energy to electrical energy. The D-mount isolator 30 exhibits direct effect damping whereby energy is shunted as heat out of the system via a simple resonant tank circuit. In an alternate embodiment, urethane polymer strips are interlaced lengthwise with thicker directional fiber-reinforced high-strength, high-stiffness elastomer strips. The urethane extracts a small amount of energy at low frequency and a higher percentage of energy at higher frequency harmonics. The interlaced polymer functions as a shock mitigation cushion and the fiber-reinforced elastomer provides large force and rigidity with actuation under aerodynamic loading.

Referring now to FIG. 9, four C-mount isolators 20 are shown disposed between a component 40 and a mounting surface 50 in a typical application. Shock and vibration data for an exemplary application include a 12-g maximum acceleration, a 2-inch maximum deflection, a 0.1-inch static deflection, a 2-inch dynamic deflection, an operating temperature range between −30° and +150° F., a 0.1-inch drift, a shock frequency between 3 and 10 Hertz, and a vibration frequency between 5 and 30 Hertz. The described arrangement is equally applicable to D-mount isolators 30.

Figure 10:
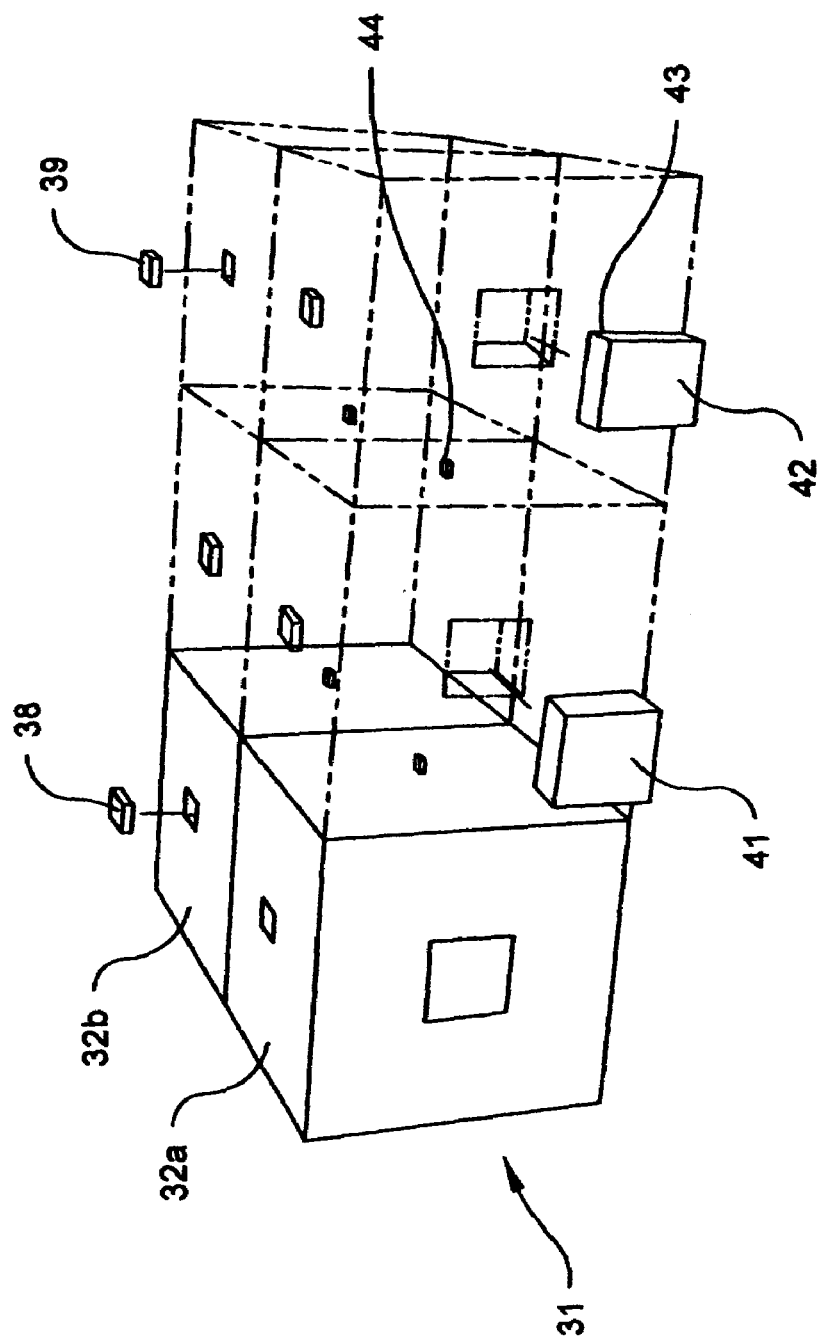
FIG. 10 is a schematic diagram showing an exemplary snap-together multi-mount block system.

The isolators described herein facilitate interlocking arrangements thereby forming passive and active-passive implementations. Referring now to FIG. 10, an exemplary snap-together multi-mount block 31 is shown. Each block 32a and 32b is representative of a C-mount isolator 20 or D-mount isolator 30. Active mode devices require a microsensor and a self-tuning microprocessor per set. For example, a piezopolymer-based microsensor patch 38 and self-tuning embedded chip 43 are attached to each actively driven isolator. Whereas, rubber or fiber-reinforced polymer caps 39, 41 and mounts 42 are attached to passively driven isolators. Connectors 44 provide communication between isolators.

Snap connectors between blocks 32a and 32b enable both x-axis and y-axis signal and power conductivity. Jumper options select signal and power conductivity paths enabling individual blocks 32a, 32b to be configured in a variety of arrangements. The terminal unit is the only unit that has a rubber-shielded microprocessor insert. The remaining units have resilient rubber caps 39, 41. Systems utilize either a single sensor, preferred embodiments employ a silicon MEMS device, or sensors in several units within a distributed controller design. The remaining units have flexible inserts. The described systems are self-encapsulated and require a single upstream trans-impedance current source.

A multi-mount block 31 may be attached to a spring-loaded canister and thereafter clamped to a pipe. Temperature compensation may be in-built by adjusting a reset magnetic circuit in the magneto-mechanical portion of the system.

Figure 12:
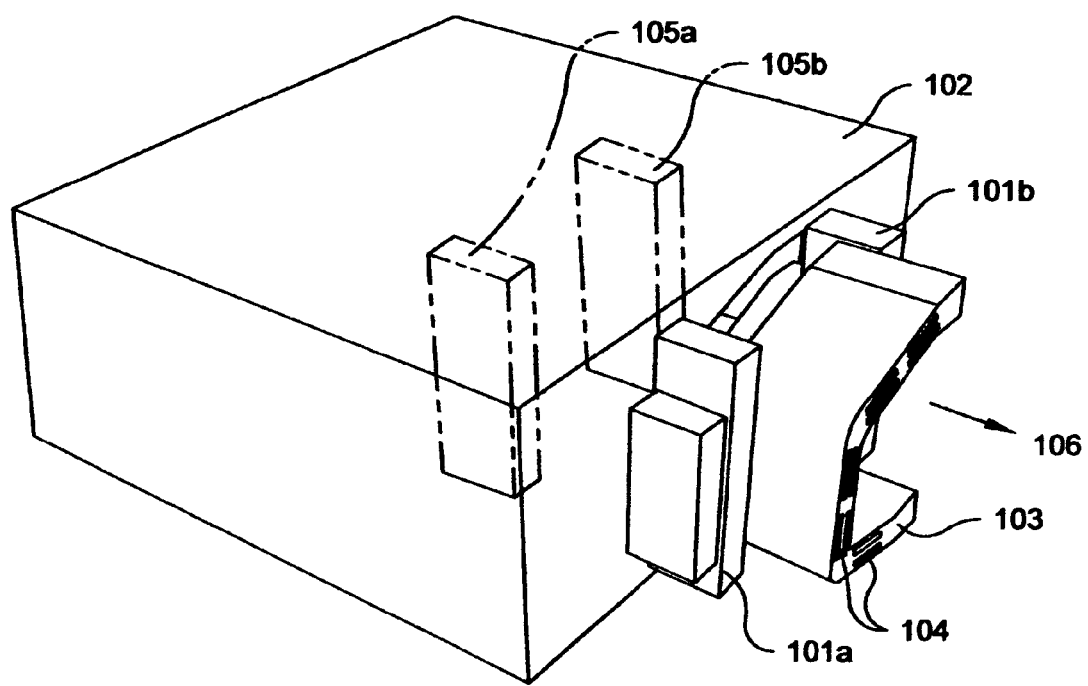
FIG. 12 is a perspective view of an exemplary extrusion machine for the oriented manufacture of magnetostrictive composites.

Referring now to FIG. 12, one possible orientation of the preferred manufacture process is shown whereby solidification of a ferromagnetic powder into pseudo-chains is enabled by a pair of alignment devices 101a and 101b. The alignment devices 101a, 101b are aligned and flush mounted at the extrusion exit so as to induce magnetic flux lines in a desired orientation within the first insert 4 and second insert 5 or dampening element 9 during cool down. As the material travels in the extrusion direction 106, the alignment devices 101a, 101b induce the desired solidification alignment. A second set of alignment devices 105a and 105b may reside within the machine 102 so as to induce additional pre-alignment during the heating process. Example machines 102 include injection molding and extrusion equipment understood within the art.

The emergent composite 103 may also include one or more pre-aligned damping materials 104. Damping materials 104 are integrated into the composite 103, for example a short fiber-reinforced elastomer, during actual extrusion. The composite 103 is cleaved after exiting the machine 102 to the desired length. The alignment devices 101a, 101b may include permanent magnets, magnetic field effect devices, EMP (electromagnetic pulse) devices, and cool magnets.

Referring again to FIG. 12, the fabrication process uses a stationary high magnetic flux density arrangement that causes alignment as the material extrudes and before cooling is initiated. Damping alloy particulates are aligned at high temperature, since they become less ferromagnetic at lower temperatures. This behavior is advantageous to semi-passive mount isolator designs. The disappearance of magnetic response by the magnetostrictive particulates may allow the introduction of a second set of magnetic particles, such as AlNiCa, which may be used to "internally" tune the mounts damping parameters. A static magnet or coil may be used to induce the necessary magnetic bias across the mount. The system becomes an RL equivalent circuit as the static value is changed or an external resistance is modified through the simple dial-up rotation of NdCo bias magnets.

As the polymer emerges from the die with some exit velocity, it is pulled by take-up equipment through a cooling medium, such as a water bath. A key process variable is the take-up ratio (TUR) of line velocity to exit velocity. The line velocity established by the take-up equipment is generally higher than the die exit velocity.

The main challenge to using extrusion manufacture lies in the nature of molecular alignment during extrusion. Due to the parabolic nature of the velocity profile, there is a high tendency for alignment in the machine direction. That is for a typical L/D of 10, the alignment of molecules or fiber whiskers is in the direction of the flow field at the outlet.

Figure 15:
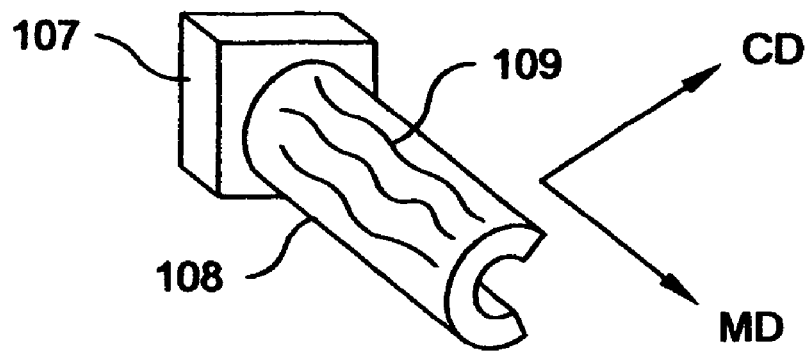
FIG. 15 is a schematic diagram showing an extruded C-mount with machine-directional molecular orientation.

Molecular orientation of the polymer is an important characteristic that determines the final mechanical properties of the mount. Referring now to FIG. 15, an exemplary extruder die 107 and extruded c-mount 108 are shown. In conventional extrusion processes, the predominant molecular orientation 109 is in the direction at which the polymer emerges from the extruder die 107, also called the machine direction (MD). As such, the extruded c-mount 108 is stronger along its MD axis.

Two mechanisms contribute to MD orientation. Shear stresses cause the chain-like molecules to orient along the flow direction, as the polymer flows through the die. A TUR greater than one stretches the extruded c-mount 108 to further favor MD orientation that is frozen as the polymer solidifies.

When a product has a predominant direction of orientation, it is said to have anisotropic properties. In terms of tensile strength, anisotropy results when a product is stronger along a first axis and weaker along a second axis perpendicular to the first axis. In the present invention, it is advantageous to extrude mount material in a manner that favors CD orientation and tensile strength.

Figure 16:
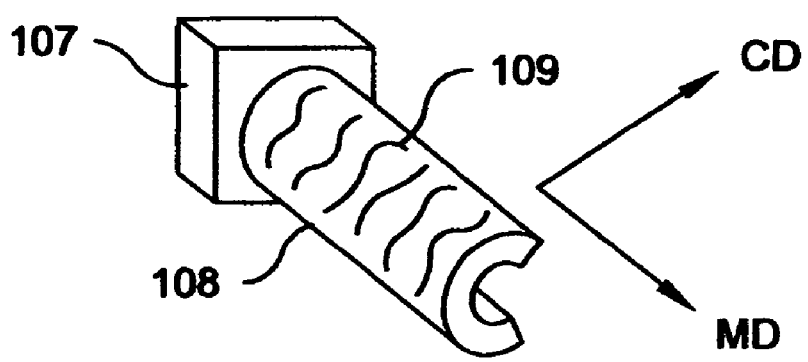
FIG. 16 is a schematic diagram showing an extruded C-mount with cross-directional molecular orientation.

Referring now to FIG. 16, an extruded C-mount 108 is shown with molecular orientation 109 along its CD axis. CD orientation may be achieved by a shear flow that aligns molecules in the CD and a TUR that minimizes MD orientation.

Magnetic particulates, one example being commercial grade AlNiCo, are introduced directly into the composite 103 at a Curie temperature below the magnetization temperature of the ferromagnetic particulates to create an internal, and moreover tunable, RL equivalent impedance.

Preferred embodiments are composed of MSM alloys wherein the magnetic field moves microscopic parts of the material, referred to twins, thereby creating a netshape change of the material. This mechanism enables more complicated shape changes than conventional linear strain, such as bending and shear. FMSA powder/polymer micro-composites are made with a layer of soft magnetic material, for example Fe—Co, to enhance response to magnetic fields by exchanging coupling for reduced dc hysteresis, lower eddy-current loss, and lower actuation field. A low actuation field is particularly advantageous to enable quasi-static tuning of mounts for variable load applications.

Short fibers are added to the composite 103 during the manufacturing process to form a polymeric treatment so as to become an integral part of the exterior lamination. Adjusting the spacing between and/or length of the fibers optimizes the damping characteristics of the treatment either during or after manufacturing. The resulting treatment provides increased vibration damping without a constraining layer. Fiber orientation is critical to the effective attenuation of vibration.

The description above indicates that a great degree of flexibility is offered in terms of the invention. Although the present invention has been described in considerable detail with reference to certain preferred versions thereof, other versions are possible. Therefore, the spirit and scope of the appended claims should not be limited to the description of the preferred versions contained herein.

What is claimed is:

1. An actively passive isolator mount for shock and vibration isolation comprising:
   (a) a C-shaped damping element comprising a resilient matrix and a plurality of magneto-mechanical inclusions enclosed within said resilient matrix;
   (b) a rigid C-shaped outer damping shell capable of withstanding repeated deflections and strains;
   (c) a rigid C-shaped inner damping bulkhead capable of withstanding repeated deflections and strains, said C-shaped damping element disposed between and fastened to said C-shaped outer damping shell and said C-shaped inner damping bulkhead so that said actively passive isolator mount has an open end and an interior cavity, said open end having a first side attachable to a rigid structure and a second side attachable to a component residing within said rigid structure;
   (d) a damping seal flexibly disposed and attached to said actively passive isolator mount at said open end;
   (e) a pair of covers flexibly disposed and attached about said outer damping shell, said damping seal and said covers being non-load bearing and sealing said interior cavity from environmental conditions and contaminants;
   (f) an electronics module which resets said magneto-mechanical inclusions non-mechanically after one or more loads are applied to said actively passive isolator mount thereby dissipating shock and vibrations, said electronics module oriented within said cavity parallel to shock and vibration; and
   (g) a low-density fill filling said cavity and isolating said electronics module from shock and vibration.

2. The actively passive isolator mount of claim 1, wherein said C-shaped damping element dissipates mechanical energy as heat energy.

3. The actively passive isolator mount of claim 1, wherein said C-shaped damping element dissipates mechanical energy as magnetic energy.

4. The actively passive isolator mount of claim 1, wherein said C-shaped damping element has a plurality of randomly oriented short length fiber inclusions.

5. The actively passive isolator mount of claim 1, wherein said C-shaped damping element has a plurality of short length chaff inclusions.

6. A multi-mount block for shock and vibration isolation comprising at least two actively passive isolator mounts of claim 1 communicatively attached so as to individually respond to load conditions.

7. A multi-mount block for shock and vibration isolation comprising at least two actively passive isolator mounts of claim 1 communicatively attached so as to mutually respond to load conditions.

* * * * *